(12) United States Patent
Kim et al.

(10) Patent No.: US 8,724,066 B2
(45) Date of Patent: May 13, 2014

(54) LIQUID CRYSTAL DISPLAY

(75) Inventors: Ji-Sun Kim, Seoul (KR); Seongyoung Lee, Anyang-si (KR); Chongchul Chai, Seoul (KR); Joon-Chul Goh, Hwaseong-si (KR); Young-Soo Yoon, Anyang-si (KR)

(73) Assignee: Samsung Display Co., Ltd., Yongin (KR)

( * ) Notice: Subject to any disclaimer, the term of this patent is extended or adjusted under 35 U.S.C. 154(b) by 307 days.

(21) Appl. No.: 13/162,956

(22) Filed: Jun. 17, 2011

(65) Prior Publication Data

US 2012/0182513 A1     Jul. 19, 2012

(30) Foreign Application Priority Data

Jan. 17, 2011    (KR) .................. 10-2011-0004630

(51) Int. Cl.
    *G02F 1/1343*      (2006.01)

(52) U.S. Cl.
    USPC ........................................... 349/143

(58) Field of Classification Search
    None
    See application file for complete search history.

(56) References Cited

U.S. PATENT DOCUMENTS

| 5,414,547 | A | 5/1995 | Matsuo et al. | |
|---|---|---|---|---|
| 2007/0097307 | A1* | 5/2007 | Kim et al. | 349/143 |
| 2008/0204613 | A1* | 8/2008 | Kim et al. | 349/33 |
| 2009/0316102 | A1* | 12/2009 | Cho et al. | 349/144 |
| 2011/0261277 | A1* | 10/2011 | Chung et al. | 349/43 |
| 2012/0008058 | A1* | 1/2012 | Kim et al. | 349/41 |

FOREIGN PATENT DOCUMENTS

| JP | 11-160692 | 6/1999 |
|---|---|---|
| KR | 1020100031378 | 3/2010 |

* cited by examiner

*Primary Examiner* — Sarah Hahm
(74) *Attorney, Agent, or Firm* — H.C. Park & Associates, PLC

(57) ABSTRACT

A liquid crystal display includes: a first substrate having pixels, each pixel including a display area and a non-display area; a second substrate facing the first substrate and including a common electrode; and a liquid crystal layer disposed between the first substrate and the second substrate. Each pixel includes a first transistor, a second transistor, a main pixel electrode having a first connection part electrically connected to the first transistor, and a sub-pixel electrode having a second connection part electrically connected to the second transistor. The first and second connection parts are disposed in the non-display area. A protective layer is disposed between the first connection parts the first transistors and between second connection parts and the second transistors.

21 Claims, 13 Drawing Sheets

LIQUID CRYSTAL DISPLAY

CROSS-REFERENCE TO RELATED APPLICATION

This application claims priority from and the benefit of Korean Patent Application No. 10-2011-0004630, filed on Jan. 17, 2011, which is hereby incorporated by reference for all purposes as if fully set forth herein.

BACKGROUND

1. Field of the Invention

Exemplary embodiments of the present disclosure relate to a liquid crystal display having improved display quality.

2. Discussion of the Background

Recently, a patterned vertical alignment (PVA) mode and a multi-domain vertical alignment (MVA) mode have been developed, in order to realize liquid crystal displays having a is wide viewing angle.

In a PVA mode liquid crystal display, a portion of an electrode used to generate an electric field is removed, in order to form a plurality of domains in one pixel. In a PVA mode liquid crystal display, such an electrode is provided with a protrusion, in order to form the domains in a pixel. According to the above-mentioned structure, however, an aperture ratio and a response speed may decrease, due to random motions generated in the liquid crystals. In addition, an afterimage may appear due to a reverse domain effect.

SUMMARY

Exemplary embodiments of the present invention provide a liquid crystal display having improved display quality.

According to exemplary embodiments of the present invention, provided is a liquid crystal display that includes a first substrate, a second substrate, and a liquid crystal layer disposed between the first substrate and the second substrate. The first substrate includes a plurality of pixels, each having a display area and a non-display area. The second substrate faces the first substrate and includes a common electrode.

Each pixel includes: a first transistor; a second transistor; a main pixel electrode including a first connection part that is electrically connected to the first transistor; a sub-pixel electrode including a second connection part that is electrically connected to the second transistor; and a protective layer. The first connection part and the second connection part are disposed in the non-display area.

The protective layer covers the first and second transistors and includes a first contact hole and a second contact hole, which are formed in the non-display area, to expose a is drain electrode of the first transistor and a drain electrode of the second transistor, respectively. The first connection part is extended from the main pixel electrode, so as to be connected to the first transistor through the first contact hole. The second connection part is extended from the sub-pixel electrode, so as to be connected to the second transistor through the second contact hole.

According to exemplary embodiments of the present invention, a liquid crystal display is provided that includes a first substrate having a plurality of pixels, a second substrate facing the first substrate and including a common electrode, and a liquid crystal layer disposed between the first substrate and the second substrate. Each pixel includes a transistor and a pixel electrode having at least two connection parts electrically connected to the transistor, with a protective layer disposed therebetween.

According to exemplary embodiments of the present invention, a liquid crystal display is provided that includes a first substrate having a plurality of pixels, a second substrate facing the first substrate and including a common electrode, and a liquid crystal layer disposed between the first substrate and the second substrate. Each pixel includes a first transistor, a second transistor, a main pixel electrode electrically connected to the first transistor, a sub-pixel electrode electrically connected to the second transistor, and a dummy connection part disposed between the first transistor and the main pixel electrode, or between the second transistor and the sub-pixel electrode. At least one of the main pixel electrode and the sub-pixel electrode of adjacent pixels may have different shapes.

According to various embodiments, the contact hole of the main pixel electrode is formed in the non-display area, and the main pixel electrode is connected to the first transistor through the first connection part. Thus, an aperture ratio of the liquid crystal display increases, is thereby improving display quality.

In addition, in a structure where the semiconductor layer is integrally formed with the source electrode and the drain electrode, an error in transmitting or receiving a radio wave in the liquid crystal layer, which occurs when the semiconductor layer reacts to light incident from a rear surface of the first substrate, may be prevented, by forming the contact hole of the main pixel electrode in the non-display area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
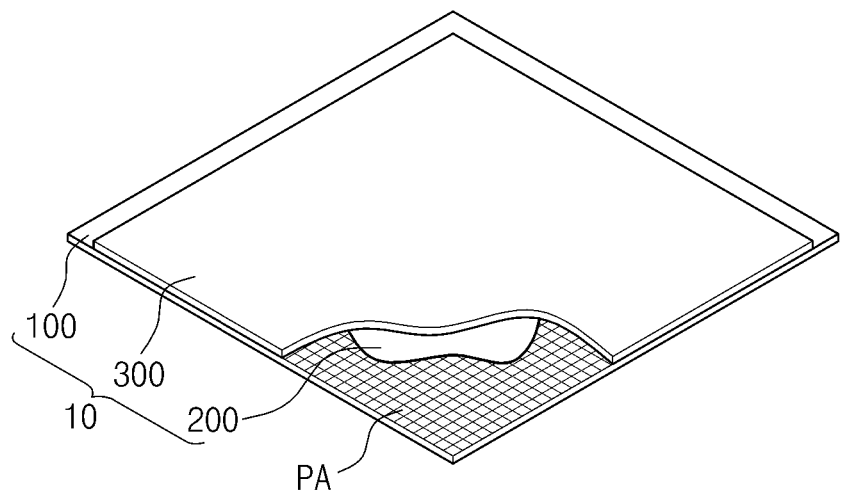
FIG. 1 is a partially cut-away perspective view showing a liquid crystal display, according to an exemplary embodiment of the present invention.

The aspects of the present invention are described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
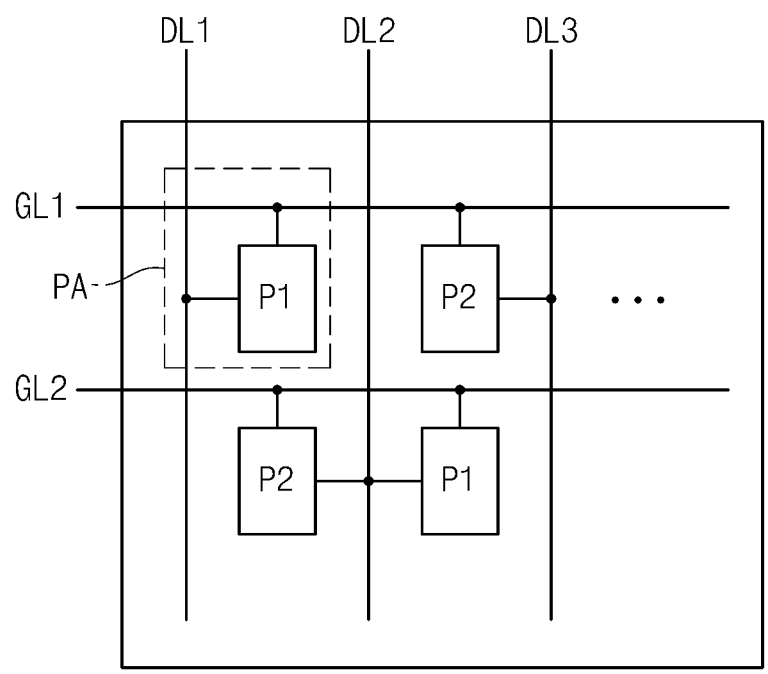
FIG. 2 is a plan view showing a portion of the liquid crystal display of FIG. 1.

FIG. 1 is a partially cut-away perspective view showing a liquid crystal display 10, according to an exemplary embodiment of the present invention, and FIG. 2 is a plan view showing a portion of the liquid crystal display 10 of FIG. 1. Referring to FIGS. 1 and 2, the liquid crystal display (LCD) 10 includes a first substrate 100, a second substrate 300, and a liquid crystal layer 200 disposed between the first substrate 100 and the second substrate 200.

The first substrate 100 includes a plurality of pixels PA, a plurality of gate lines, and a plurality of data lines, which are arranged on a first base substrate. The gate lines extend in a horizontal direction to sequentially receive a gate signal. The data lines cross the gate lines to receive a data voltage. For the convenience of explanation, FIG. 2 shows two gate lines (e.g., a first gate line GL1 and a second gate line GL2) and three data lines (e.g., a first data line DL1, a second data line DL2, and a third data line DL3). However, additional gate lines and data lines may be included.

The pixels PA may be arranged in a matrix configuration having a plurality of columns and a plurality of rows. The pixels PA may include first pixels P1 and second pixels P2. Detailed descriptions of the first pixels P1 and the second pixels P2 will be described with reference to FIGS. 3 to 6.

Referring to FIG. 2, each of the first pixels P1 is connected to a data line positioned to the left side thereof, and each of the second pixels P2 is connected to a data line positioned to the right side thereof. The first pixels P1 connected to the first gate line GL1 are alternately arranged with the first pixels P1 connected to the second gate line GL2. A data voltage applied to the first and third data lines DL1 and DL3 may have a different polarity from a data voltage applied to the second data line DL2. As an example, the first and third data lines DL1 and DL3 may receive a voltage having a higher level than that of a common voltage, and the second data line DL2 may receive a voltage having a lower level than that of the common voltage. Thus, a voltage applied to the pixels PA connected to the first gate line GL1 may have a different polarity from a voltage applied to the pixels PA connected to the second gate line GL2, thereby improving a voltage stability of the common voltage.

The second substrate 300 is arranged to face the first substrate 100. The second substrate 300 includes a black matrix and a common electrode, which are arranged on a second base substrate. The liquid crystal layer 200 is disposed between the first substrate 100 and the second substrate 300 and the liquid crystal layer 200 may be a vertically aligned liquid crystal layer having a negative dielectric anisotropy.

In the present exemplary embodiment, the first and second pixels P1 and P2 have a rectangular shape extending in one direction. However, the shape of the first and second pixels P1 and P2 is not limited thereto. That is, each pixel PA may have a V-shape, a Z-shape, or the is like.

Figure 3:
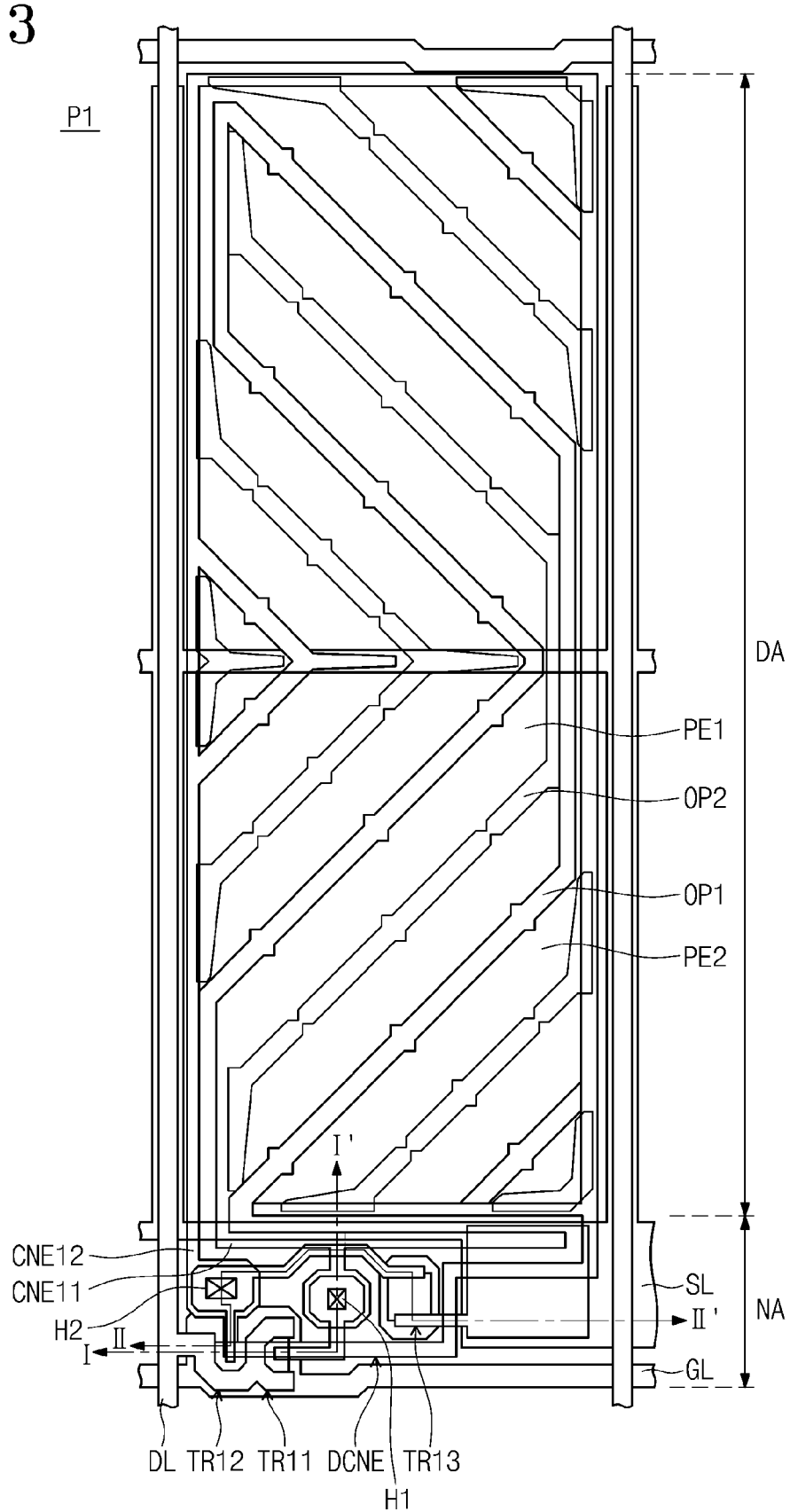
FIG. 3 is a plan view showing a structure of a first pixel of the liquid crystal display of FIG. 1.
Figure 4:
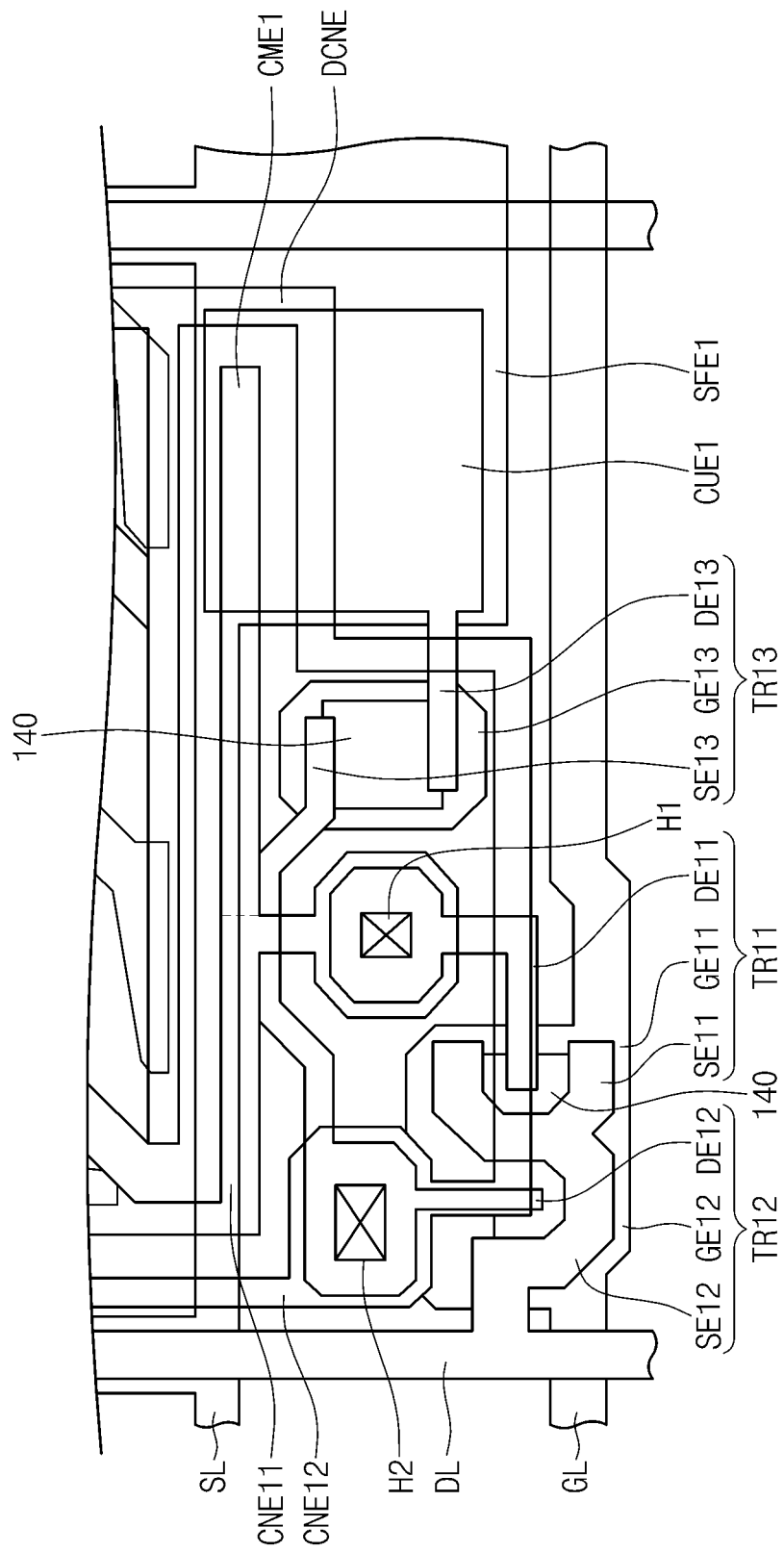
FIG. 4 is a partially enlarged view showing a portion of FIG. 3.
Figure 5A:
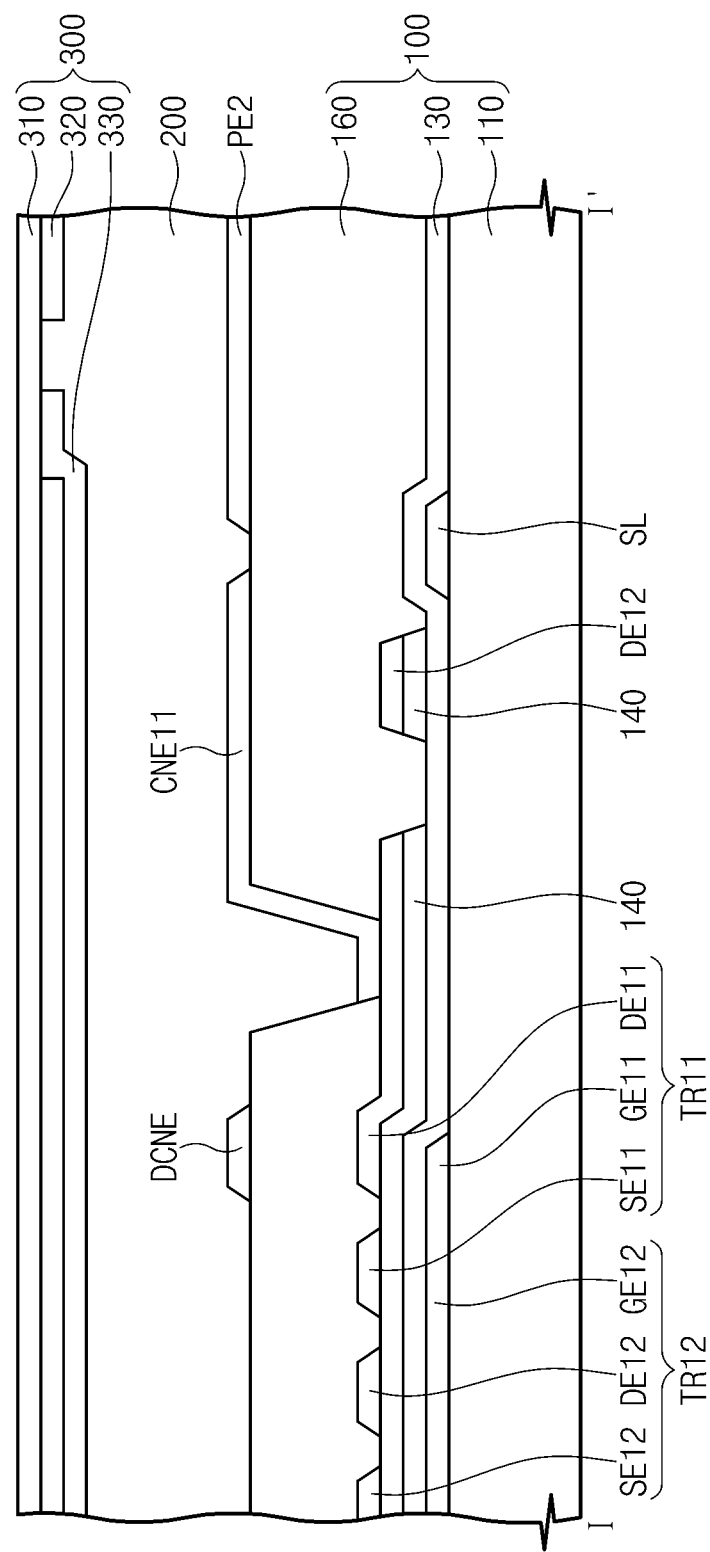
FIG. 5A is a cross-sectional view taken along line I-I' of FIG. 4.
Figure 5B:
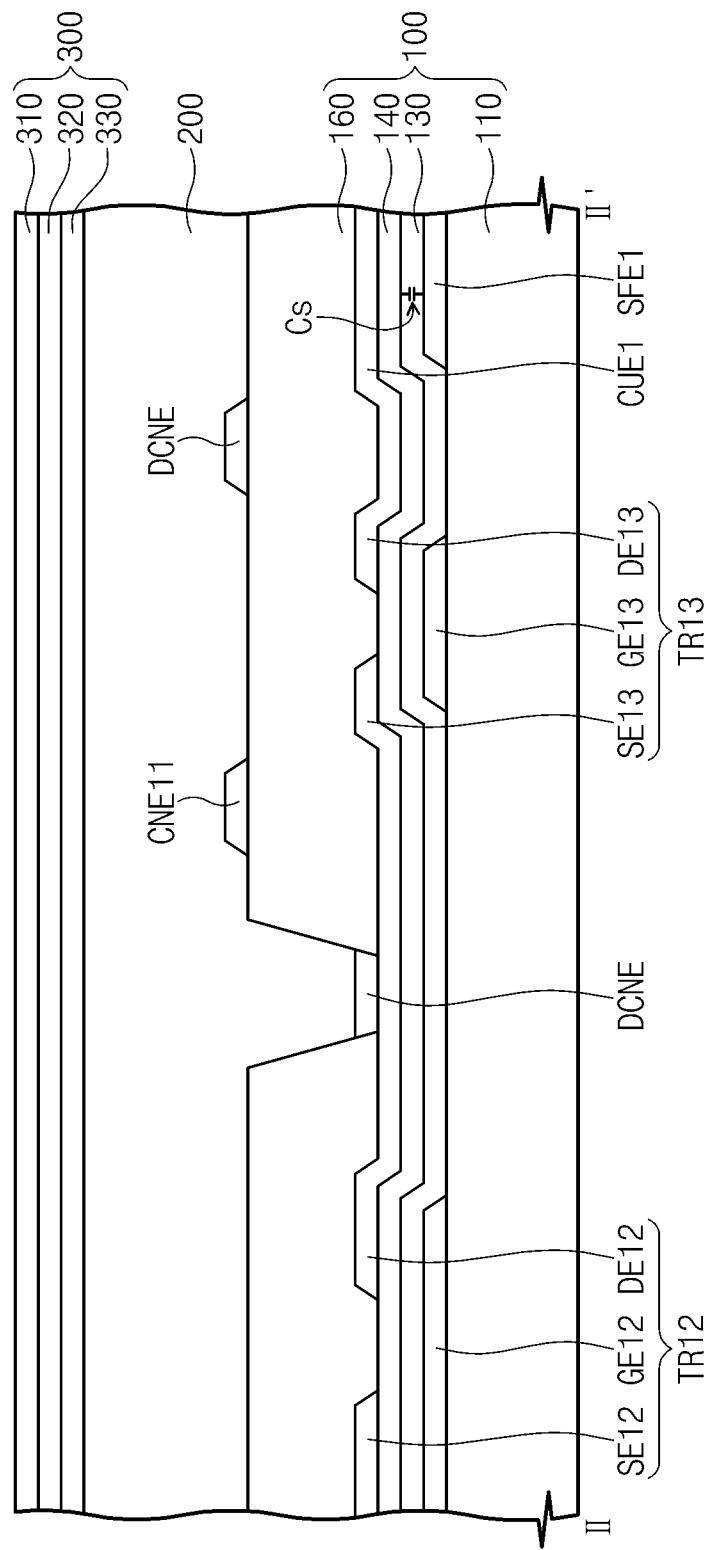
FIG. 5B is a cross-sectional view taken along line II-II' of FIG. 4.

FIG. 3 is a plan view showing a structure of a first pixel P1, according to an exemplary embodiment of the present invention, and FIG. 4 is a partially enlarged view showing a non-display area of FIG. 3. In addition, FIG. 5A is a cross-sectional view taken along line I-I' of FIG. 4, and FIG. 5B is a cross-sectional view taken along line II-II' of FIG. 4. Since the first pixels P1 have the same structure and function, one pixel will be described in detail as a representative example.

Referring to FIGS. 3, 4, 5A, and 5B, the first pixel P1 includes a display area DA and a non-display area NA. The non-display area NA includes a first transistor TR11, a second transistor TR12, a third transistor TR13, a coupling electrode CUE1, a storage electrode SFE1, a first connection part CNE11, a second connection part CNE12, a dummy connection part DCNE, and a compensation electrode CME1. The non-display area NA includes a storage line SL that is substantially parallel to the gate line GL and is applied with a storage voltage. The non-display area NA includes portions of the gate line GL and the data line DL.

The first and second transistors TR11 and TR12 output a data signal in response to the gate signal. The first transistor TR11 and the second transistor TR12 are arranged adjacent to each other.

The first transistor TR11 includes a first gate electrode GE11 branched from the gate line GL, a first source electrode SE11 branched from the data line DL, and a first drain electrode DE11 spaced apart from the first source electrode SE11 and disposed on the first gate electrode GE11. A semiconductor layer 140 is formed between the first gate electrode GE11 and the first source electrode SE11, and between the gate electrode GE11 and the first drain electrode DE11.

The semiconductor layer 140 may be formed through the same patterning process as the first source and drain electrodes SE11 and DE11. A portion of the semiconductor layer 140 may be disposed under the data line DL and the first source and drain electrodes SE11 and DE11. Since an error in transmitting or receiving a radio wave may occur, due to light incident to a lower portion of the semiconductor layer 140, a light blocking layer (not shown) may be disposed under the data line DL. The light blocking layer may be integrally formed with the storage line and may be formed on the same layer as the first and second gate electrodes GE11 and GE12.

Similar to the first transistor TR11, the second transistor TR12 includes a second gate electrode GE12 branched from the gate line GL, a second source electrode SE12 branched from the data line DL, and a second drain electrode DE12 spaced apart from the second source electrode SE12 and disposed on the second gate electrode GE12. A portion of the semiconductor layer 140 is disposed between the second gate electrode GE12 and the second source and drain electrodes SE and DE12.

The semiconductor layer 140 may be formed through the same patterning process as the second source and drain electrodes SE12 and DE12. A portion of the semiconductor layer 140 may be disposed under the second source and drain electrodes SE12 and DE12.

The third transistor TR13 includes a third gate electrode GE13, a third source electrode SE13 electrically connected to the second drain electrode DE12, and a third drain electrode DE13 spaced apart from the third source electrode SE13 and disposed on the third gate electrode GE13. Similar to the structure of the first and second transistors TR11 and TR12, a portion of the semiconductor layer 140 is formed between the third gate electrode GE13 and the third source and drain electrodes SE13 and DE13.

The semiconductor layer 140 may be formed through the same patterning process as the third source and drain electrodes SE13 and DE13. A portion of the semiconductor layer 140 may be disposed under the third source and drain electrodes SE13 and DE13. The third gate electrode GE13 is formed in an island-shape and is electrically floated.

The common electrode 330 has a plurality of second openings OP2, to divide an area where first and second pixel electrodes PE1 and PE2 are formed into a plurality of domains. Accordingly, liquid crystal molecules of the liquid crystal layer 200 are aligned in different directions in each domain. Each of the second openings OP2 may be positioned at central portions of the first and second pixel electrodes PE1 and PE2.

A protective layer 160 including an insulating material is formed on the first to third transistors TR11, TR12, and TR13 and the coupling electrode CUE1. The protective layer 160 has a first contact hole H1 and a second contact hole H2, to expose the first drain electrode DE11 and the second drain electrode DE12, respectively. The first and second contact holes H1 and H2 are disposed in the non-display area NA.

A main pixel electrode PE1 is formed on the protective layer 160, at a central portion of the display area DA. A sub-pixel electrode PE2 is formed on the protective layer 160, so as to surround the main pixel electrode PE1. The main pixel electrode PE1 is spaced apart from the sub-pixel electrode PE2 by a first opening OP1.

The first connection part CNE11 extends from the main pixel electrode PE1. The first connection part CNE11 is connected to the first transistor TR11 through the first contact hole H1 and transmits the data voltage to the main pixel electrode PE1.

The second connection part CNE12 extends from the sub-pixel electrode PE2. The second connection part CNE2 is connected to the second transistor TR12 through the second is contact hole H2 and transmits the data voltage to the sub-pixel electrode PE2.

The first contact hole H1 is disposed in the non-display area NA, and the main pixel electrode PE1 is connected to the first transistor TR11 through the first connection part CNE11. Thus, an aperture ratio of the LCD 10 may be increased, thereby improving the display quality of the LCD 10.

The dummy connection part DCNE extends from the sub-pixel electrode PE2, is separated from the second connection part CNE12, and is disposed in the non-display area NA. Similar to the second connection part CNE12, the dummy connection part DCNE extends from the sub-pixel electrode PE2 and is connected to the second transistor TR12 through the second contact hole H2. The dummy connection part DCNE transmits the data voltage to the sub-pixel electrode PE2. Thus, if the second connection part CNE12 is disconnected, the sub-pixel electrode PE2 may be connected to the second transistor TR12 via the dummy connection part DCNE.

The compensation electrode CME1 is used to increase the length of the first connection part CNE11, so as to be the same as the length of the first connection part CNE11 of the second pixel P2. As described above, the second substrate 300 is arranged to face the first substrate 100. The second substrate 300 includes the black matrix 320 and the common electrode 330 arranged on the second base substrate 310.

The black matrix 320 is arranged on the second base substrate 310. The black matrix 320 is arranged in an area corresponding to the non-display area NA, so as to expose only the display area DA. The common electrode 330 is arranged on the black matrix 320.

The common electrode 330 faces the main pixel electrode PE1 and the sub-pixel electrode PE2, and the liquid crystal layer 200 is disposed therebetween. Thus, a portion of the is common electrode 330 and the main pixel electrode PE1 may be referred to as a first liquid crystal capacitor, and a portion of the common electrode 330 and the sub-pixel electrode PE2 may be referred to as a second liquid crystal capacitor.

Figure 6:
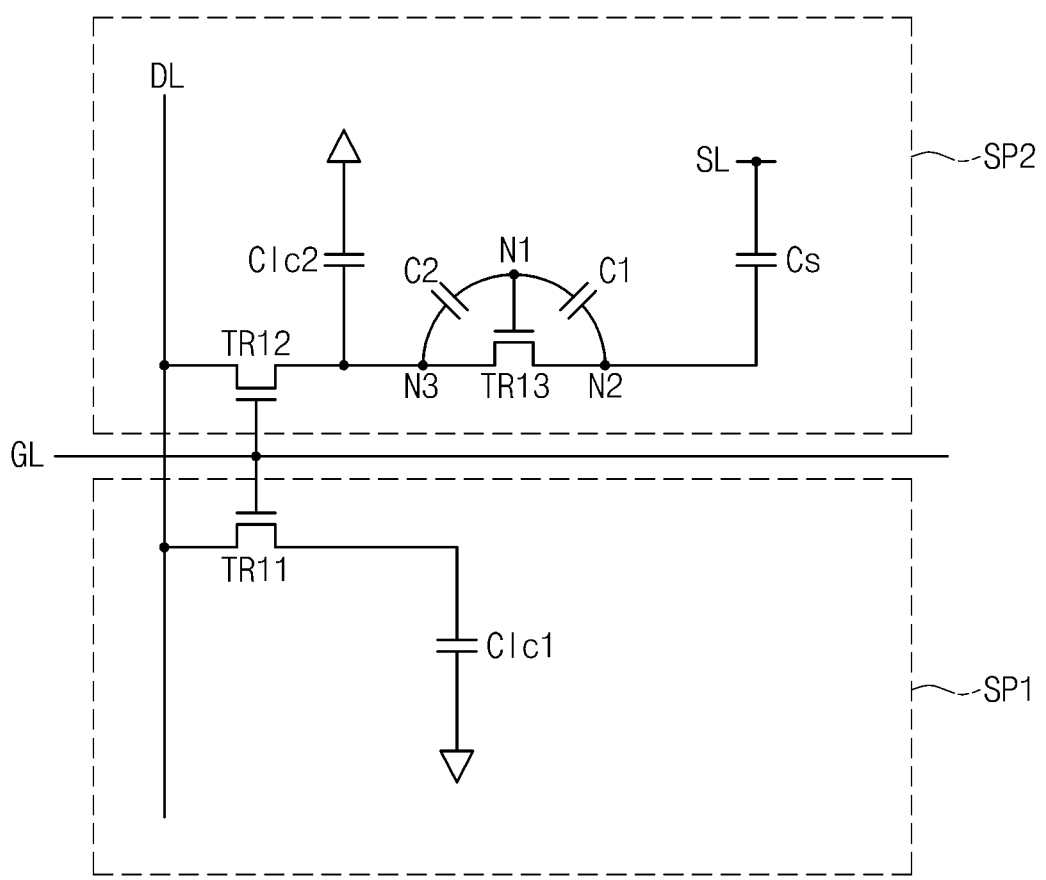
FIG. 6 is an equivalent circuit diagram of the first pixel.

FIG. 6 is an equivalent circuit diagram of the first pixel P1. Referring to FIG. 6, the first pixel P1 includes the gate line GL, the data line DL, a first sub-pixel SP1, a second sub-pixel SP2, the third transistor TR13, and a dividing capacitor Cs.

The first sub-pixel SP1 includes the first transistor TR11 and the first liquid crystal capacitor Clc1. The second sub-pixel SP2 includes the second transistor TR12 and the second liquid crystal capacitor Clc2.

Figure 7:
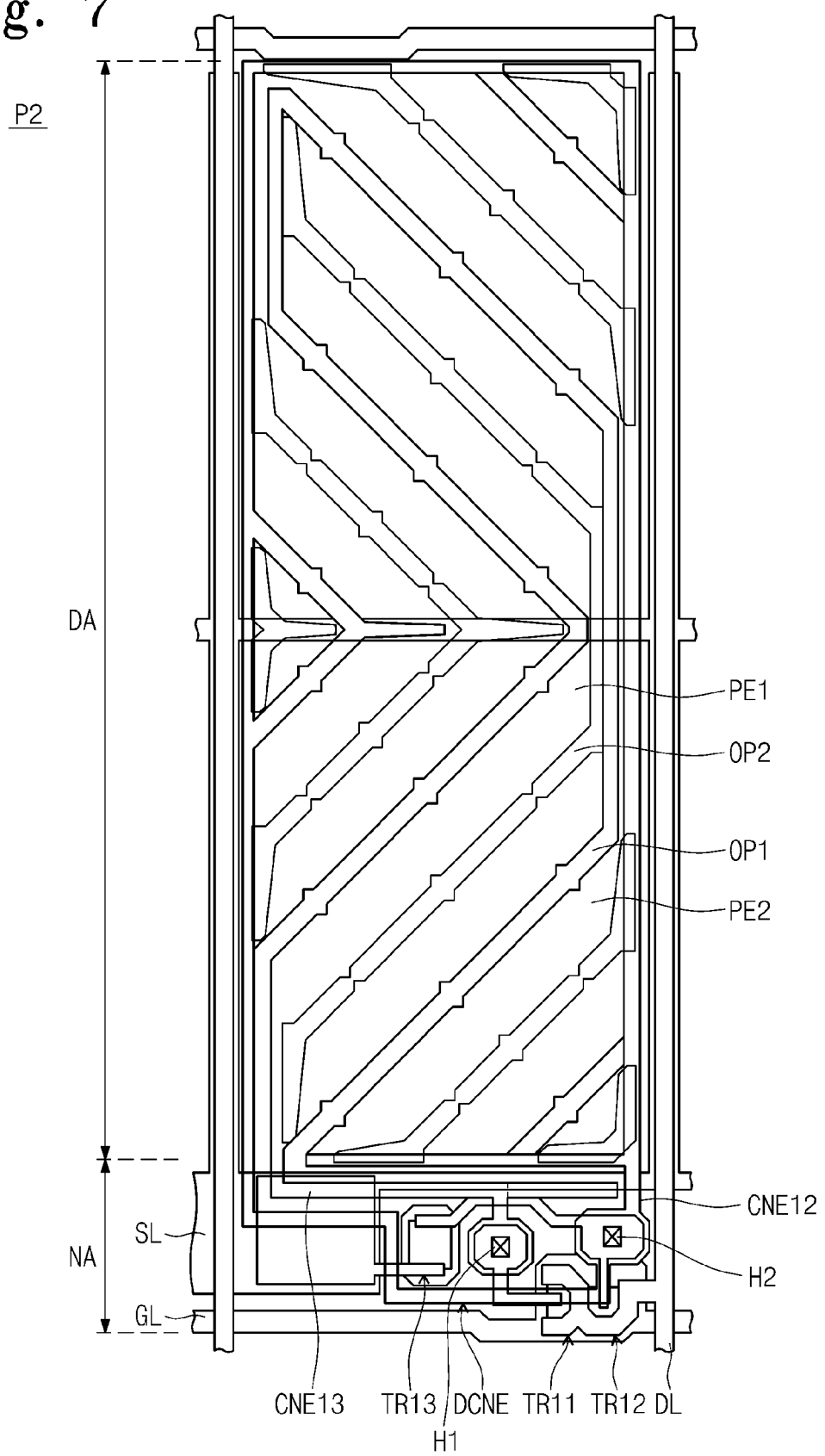
FIG. 7 is a plan view showing a structure of a second pixel of the liquid crystal display of FIG. 1.
Figure 8:
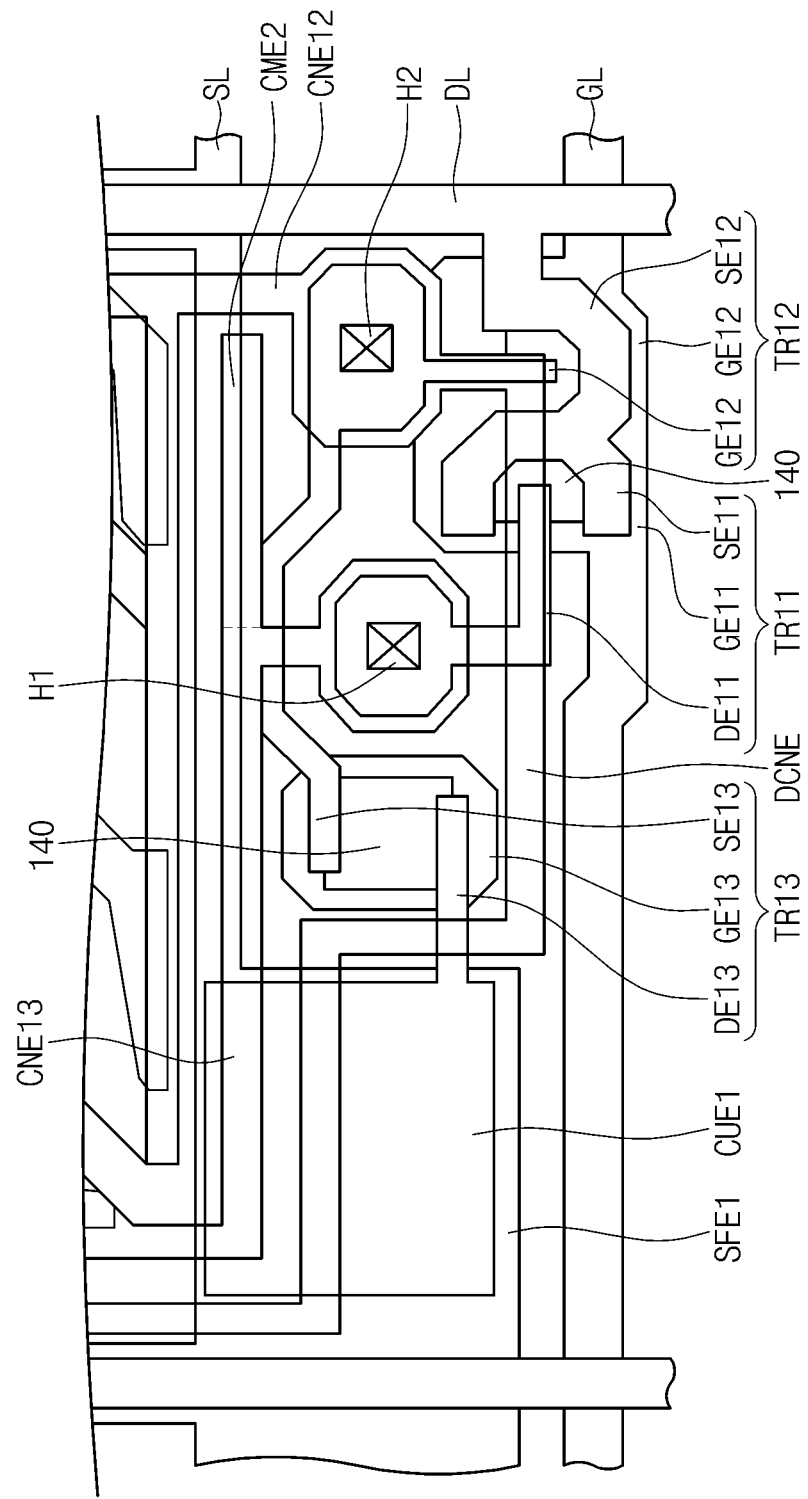
FIG. 8 is a partially enlarged view showing a portion of FIG. 7.

FIG. 7 is a plan view showing a structure of the second pixel PE2, and FIG. 8 is a partially enlarged view showing a portion of FIG. 7. The second pixel PE2 will be described as a representative example of the second pixels.

Referring to FIGS. 3, 7, and 8, the first to third transistors TR11, TR12, and TR13, the second connection part CNE12, the dummy connection part DCNE, the coupling electrode CUE1, and the storage electrode SFE1 of the second pixel P2 are arranged symmetrically with respect to those of the first pixel P1. Thus, detailed descriptions of the above will be omitted.

The second pixel P2 includes a first connection part CNE13 extending from the main pixel electrode PE1. The first connection part CNE13 is connected to the first transistor TR11 through the first contact hole H1 and transmits the data voltage to the main pixel electrode PE1.

The position of the main pixel electrode PE1 of the second pixel P2 is substantially the same as the position of the main pixel electrode PE1 of the first pixel P1. However, since the position of the first contact hole H1 of the second pixel P2 is different from is the position of the first contact hole H1 of the first pixel P1, the first connection part CNE13 of the second pixel P2 has a different length than that of the first connection part CNE11 of the first pixel P1. Therefore, the magnitude of a parasitic capacitance generated by the coupling of the first connection part CNE13 of the second pixel P2 and a peripheral area of the first connection part CNE13 is different from the magnitude of a parasitic capacitance generated by the coupling of the first connection part CNE11 of the first pixel P1 and a peripheral area of the first connection part CNE11.

Thus, the first pixel P1 and the second pixel P2 include compensation electrodes CME1 and CME2, respectively, to compensate for the difference in the lengths of the first connection part CNE11 and the first connection part CNE13. The compensation electrodes CME1 and CME2 may be integrally formed with the first connection parts CNE11 and CNE13, and a sum of the lengths of the compensation electrode CME1 and the first connection part CNE11 is substantially equal to the sum of the lengths of the compensation electrode CME2 and the first connection part CNE13.

The first contact hole H1 is formed in the non-display area NA, and the main pixel electrode PE1 is connected to the first transistor TR11 through the first connection part CNE13. As a result, the aperture ratio of the LCD 10 may be increased, thereby improving the display quality of the LCD 10.

Figure 9:
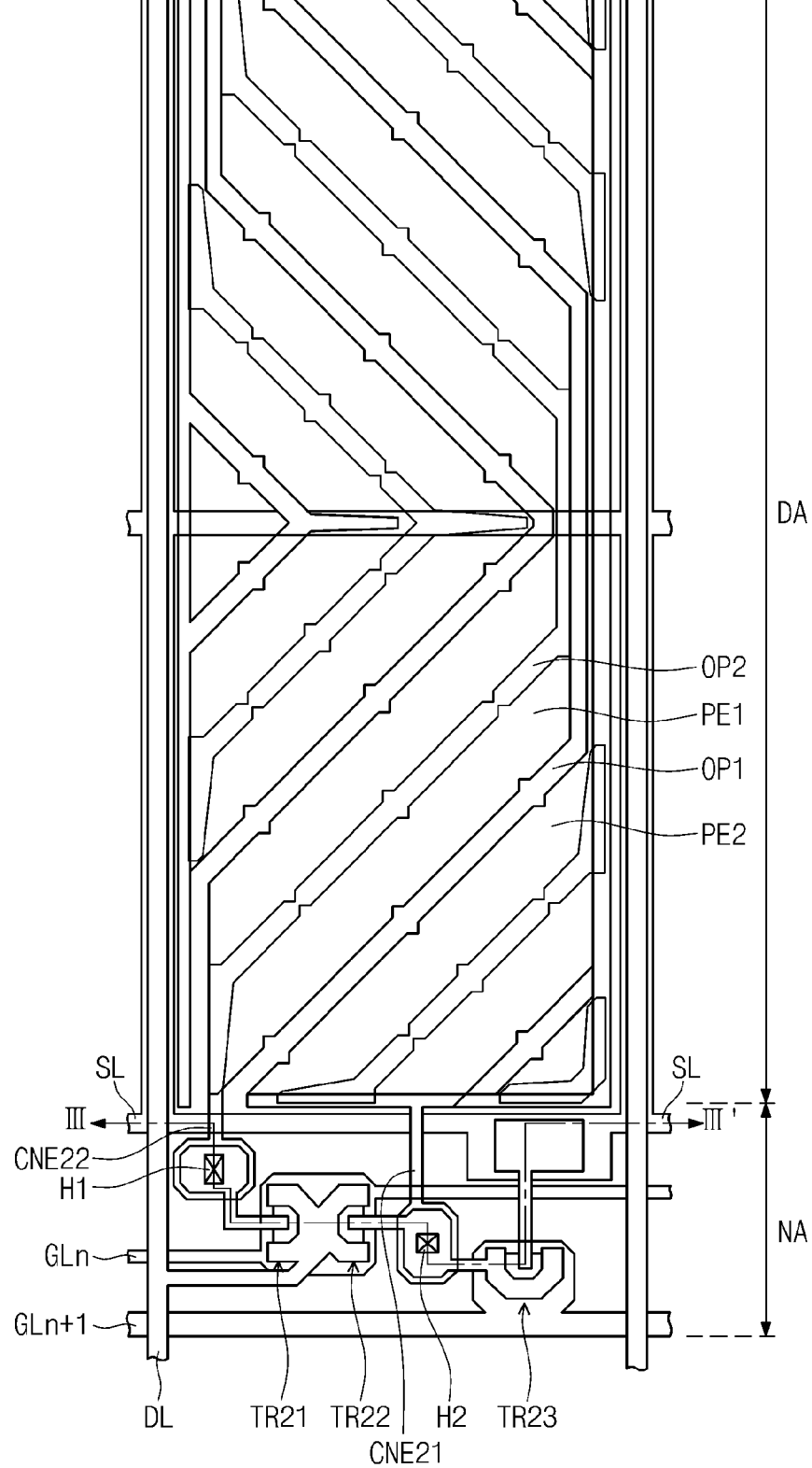
FIG. 9 is a plan view showing a structure of a pixel in a liquid crystal display, according to an exemplary embodiment of the present invention.
Figure 10:
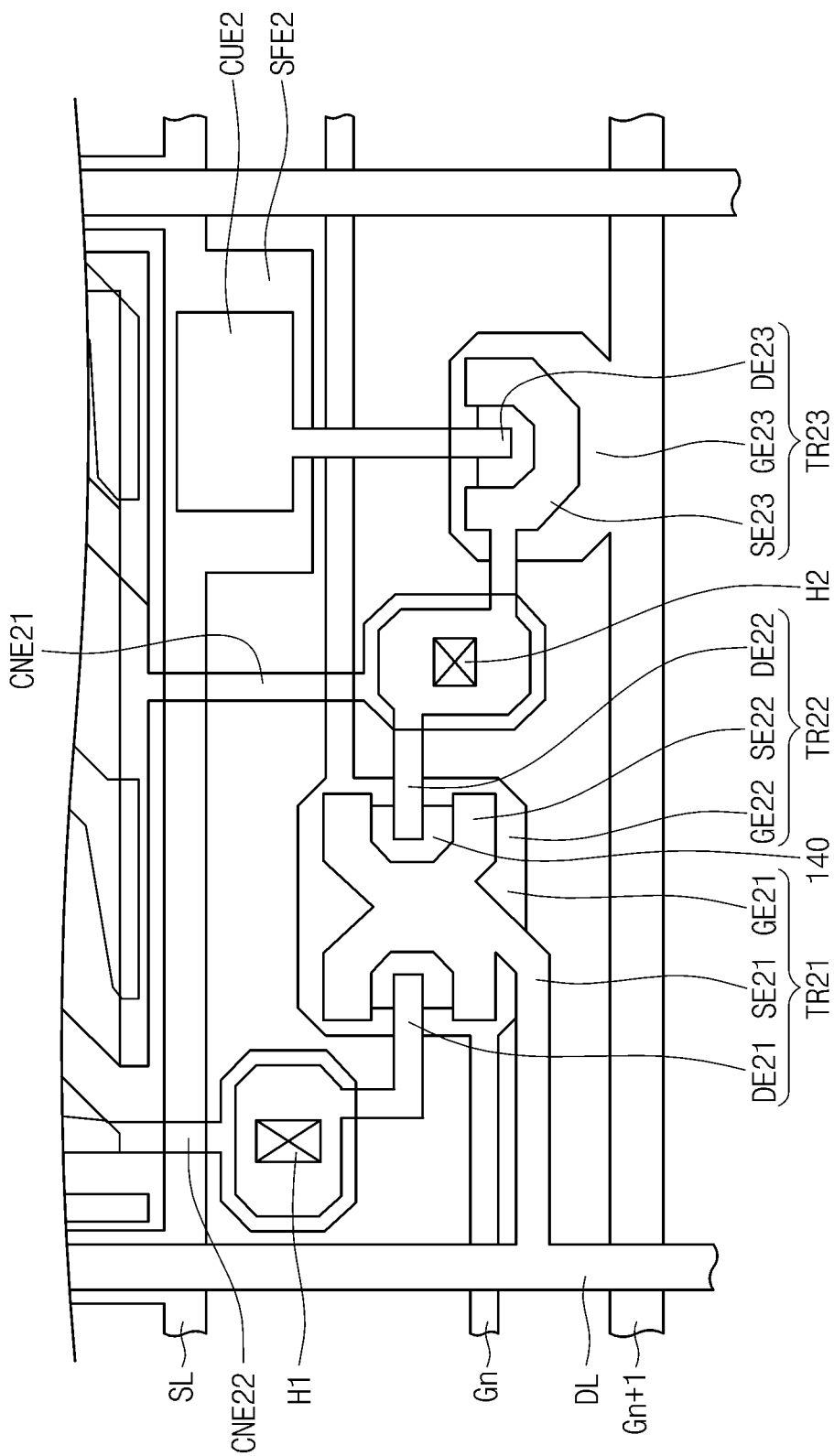
FIG. 10 is a partially enlarged view showing a portion of FIG. 9.
Figure 11:
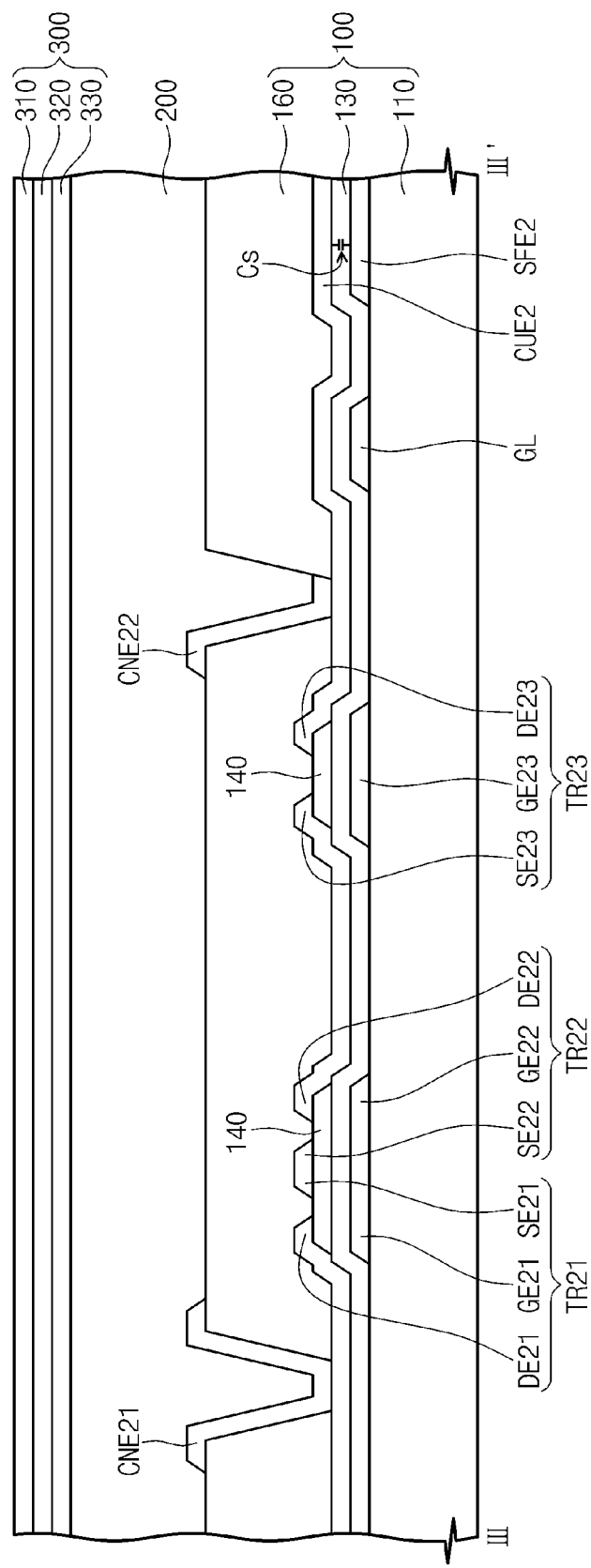
FIG. 11 is a cross-sectional view taken along line III-III' of FIG. 9.

FIG. 9 is a plan view showing the structure of a pixel in a liquid crystal display, according an exemplary embodiment of the present invention. FIG. 10 is a partially enlarged view showing a portion of FIG. 9, and FIG. 11 is a cross-sectional view taken along a line III-III' of FIG. 9.

Similar to the exemplary embodiment of FIGS. 3 and 4, the liquid crystal display of FIG. 9 includes a first substrate including a plurality of pixels disposed on a first base substrate, a second substrate including a black matrix and a common electrode disposed on a second base substrate, and a liquid crystal layer disposed between the first substrate and the second substrate. In addition, the pixels are arranged in a matrix configuration.

Since the pixels have the same structure and function, a pixel PA2 will be described as a representative example. The pixel PA2 includes a gate line GLn and a data line DL. The gate line GLn extends in a horizontal direction, and the data line DL extends in a vertical direction that is substantially perpendicular to the horizontal direction and is insulated from the gate line GLn. In addition, the pixel PA2 includes a storage line SL that is substantially in parallel to the gate line GLn and is applied with a storage voltage.

A first transistor TR21 and a second transistor TR22 output a data signal in response to a gate signal. The first transistor TR21 and the second transistor TR22 are arranged adjacent to each other.

The first transistor TR21 includes a first gate electrode GE21 branched from the gate line GLn, a first source electrode SE21 branched from the data line DL, and a first drain electrode DE21 spaced apart from the first source electrode SE21 and disposed on the first gate electrode GE21. A portion of a semiconductor layer 140 is disposed between the first gate electrode GE21 and the first source and drain electrodes SE21 and DE21.

The second transistor TR22 includes a second gate electrode GE22 branched from the gate line GLn, a second source electrode SE22 branched from the data line DL, and a second drain electrode DE22 spaced apart from the second source electrode SE22 and disposed on the second gate electrode GE22. A portion of the semiconductor layer 140 is disposed between the second gate electrode GE22 and the second source electrode and drain electrodes SE22 and DE22. The first gate electrode GE21 may be integrally formed with the second gate electrode GE22, and the first source electrode SE21 may be integrally formed with the second source electrode SE22.

A third transistor TR23 includes a third gate electrode GE23 branched from a gate line GLn+1 that is adjacent to the gate line GLn, a third source electrode SE23 electrically connected to the second drain electrode DE22, and a third drain electrode DE23 spaced apart from the third source electrode SE23 and disposed above the third gate electrode GE23.

A coupling electrode CUE2 is connected to the third drain electrode DE23. The coupling electrode CUE2 may be integrally formed with the third drain electrode DE23. A storage electrode SFE2 is branched from the storage line SL, so as to face the coupling electrode CUE2. The coupling electrode CUE2 and the storage electrode SFE2 may be referred to as a dividing capacitor Cs.

A common electrode 330 has a second opening OP2 to divide an area where first and second pixel electrodes PE1 and PE2 are formed into a plurality of domains. Thus, liquid crystal molecules of the liquid crystal layer 200 are aligned in different directions in each domain. The second opening OP2 may be positioned at central portions of the first and second pixel electrodes PE1 and PE2.

A protective layer 160 including an insulating material is disposed on the first to third transistors TR21, TR22, and TR23 and the coupling electrode CUE2. The protective layer 160 is has a first contact hole H1 and a second contact hole H2 to expose the first drain electrode DE21 and the second drain electrode DE22, respectively. The first and second contact holes H1 and H2 are disposed in the non-display area NA.

A main pixel electrode PE1 is disposed on the protective layer 160, at a central portion of a display area DA. A sub-pixel electrode PE2 is disposed on the protective layer 160, so as to surround the main pixel electrode PE2. The main pixel electrode PE1 is spaced apart from the sub-pixel electrode PE2 by a first opening OP1.

A first connection part CNE21 extends from the main pixel electrode PE1. The first connection part CNE21 is connected to the first transistor TR21 through the first contact hole H1 and transmits the data voltage to the main pixel electrode PE1.

A second connection part CNE22 extends from the sub-pixel electrode PE2. The second connection part CNE22 is connected to the second transistor TR22 through the second contact hole H2 and transmits the data voltage to the sub-pixel electrode PE2.

The second substrate 300 faces the first substrate 100. The second substrate 300 includes the black matrix 320 and the common electrode 330, which are disposed on the second base substrate 310.

The black matrix 320 is disposed on the second base substrate 210. The black matrix 320 is arranged in an area corresponding to the non-display area NA, so as to expose the display area DA. The common electrode 330 is disposed on the black matrix 320.

The common electrode 330 faces the main pixel electrode PE1 and the sub-pixel electrode PE2, with the liquid crystal layer 200 disposed therebetween. A portion of the common electrode 330 and the main pixel electrode PE1 may be referred to as a first liquid crystal capacitor, and a portion of the common electrode 330 and the sub-pixel electrode PE2 may be referred to as a second liquid crystal capacitor.

The first contact hole H1 is formed in the non-display area NA, and the main pixel electrode PE1 is connected to the first transistor TR21 through the first connection part CNE21. Thus, the aperture ratio of the LCD may be increased, thereby improving the display is quality of the LCD.

Figure 12:
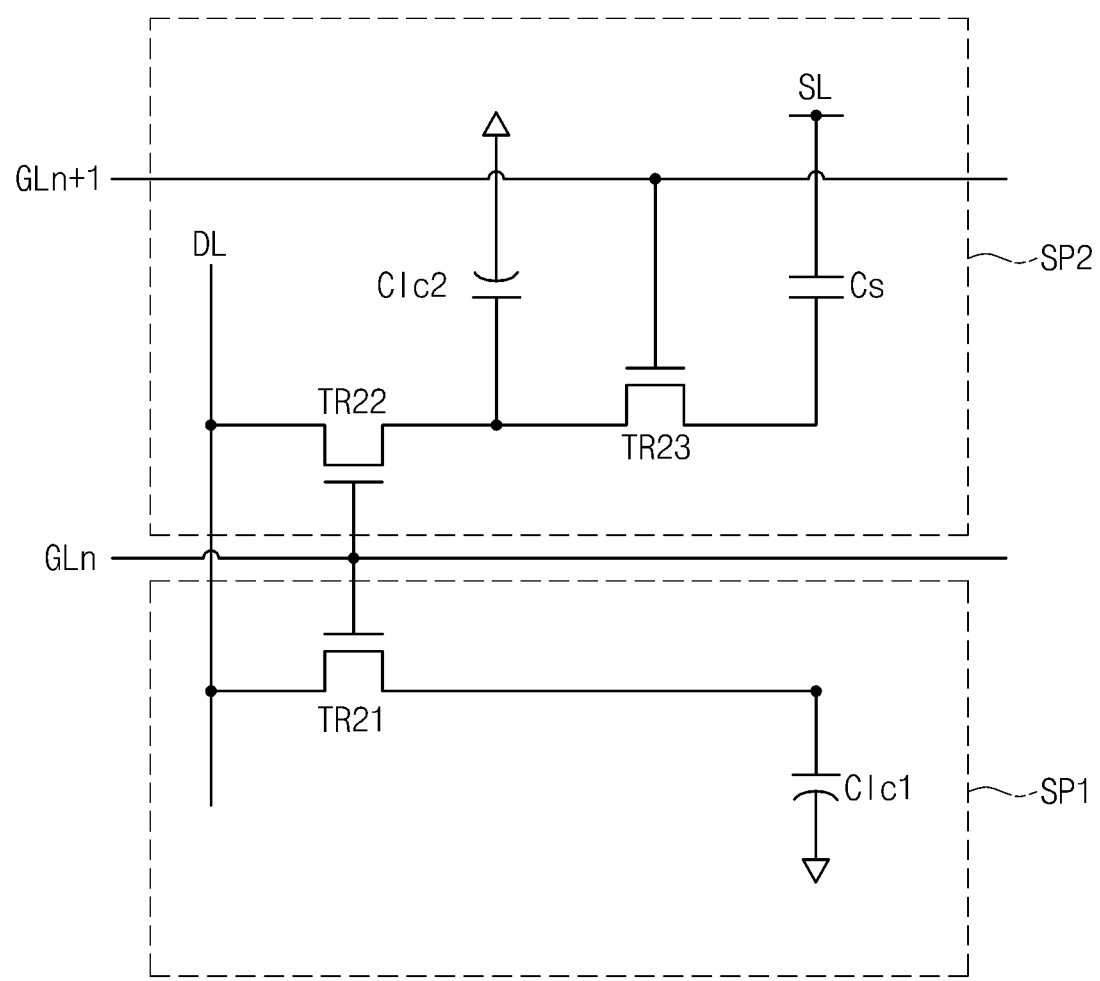
FIG. 12 is an equivalent circuit diagram of the pixel of FIG. 9.

FIG. 12 is an equivalent circuit diagram of the pixel of FIG. 9. Referring to FIG. 12, the first pixel P1 includes a present stage gate line GLn, a next stage gate line GLn+1, a data line DL, a first sub-pixel SP1, a second sub-pixel SP2, a third transistor TR23, and a first dividing capacitor Cs1. The first sub-pixel SP1 includes a first transistor TR21 and a first liquid crystal capacitor Clc1. The second sub-pixel SP2 includes a second transistor TR22 and a second liquid crystal capacitor Clc2.

Each of the first and second transistors TR21 and TR22 is connected to the present stage gate line GLn and the data line DL, to output a data voltage in response to a gate signal (hereinafter, referred to as a present gate signal) applied through the present stage gate line GLn. The first liquid crystal capacitor Clc1 is connected to the first transistor TR21 and is charged with a first pixel voltage Vp1, in response to the data voltage output from the first transistor TR21. The second liquid crystal capacitor Clc2 is connected to the second transistor TR22 and is charged with a second pixel voltage Vp2, in response to the data voltage output from the second transistor TR22.

When the first and second transistors TR21 and TR22 are turned on in response to the present gate signal, the first liquid crystal capacitor Clc1 receives the data voltage, so as to be electrically charged with the first pixel voltage Vp1, and the second liquid crystal capacitor Clc2 receives the data voltage, so as to be electrically charged with the second pixel voltage Vp2.

When the third transistor TR23 is turned on in response to a next gate signal, a current flows from the second liquid crystal capacitor Clc2 to the dividing capacitor Cs, until the voltage charged in the second liquid crystal capacitor Clc2 becomes substantially identical to the voltage charged in the dividing capacitor Cs. Thus, the second pixel voltage Vp2 becomes lower is than the first pixel voltage Vp1. When the first sub-pixel SP1 and the second sub-pixel SP2 are charged with different voltages, a user recognizes an intermediate value of the two different voltages, thereby improving the display quality (e.g., a side viewing angle).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a first substrate comprising pixels;
a second substrate facing the first substrate and comprising a common electrode; and
a liquid crystal layer disposed between the first substrate and the second substrate,
wherein each pixel comprises:
a display area;
a non-display area;
a first transistor;
a second transistor;
a main pixel electrode comprising a first connection part that is electrically connected to the first transistor and is disposed in the non-display area;
a sub-pixel electrode comprising a second connection part that is electrically connected to the second transistor and is disposed in the non-display area; and
a protective layer disposed between the first connection part and the first transistor, and between the second connection part and the second transistor,
wherein the pixels comprise:
first pixels in which the first and second transistors are disposed at a first side thereof; and
second pixels in which the first and second transistors are disposed at an opposing second side thereof.

2. The liquid crystal display of claim 1, wherein in each pixel:
the protective layer covers the first and second transistors and comprises a first contact hole disposed in the non-display area to expose a portion of a drain electrode of the first transistor, and a second contact hole disposed in the non-display area to expose a portion of a drain electrode of the second transistor;
the first connection part extends from the main pixel electrode and is connected to the first transistor through the first contact hole; and
the second connection part extends from the sub-pixel electrode and is connected to the second transistor through the second contact hole.

3. The liquid crystal display of claim 2, further comprising:
a gate line extending across the first substrate; and
a data line extending across the gate line,
wherein the first and second transistors are each connected to the gate line and the data line.

4. The liquid crystal display of claim 2, further comprising a black matrix disposed between the second substrate and the common electrode, the black matrix facing the non-display areas.

5. The liquid crystal display of claim 2, wherein each pixel further comprises a dummy connection part disposed in the non-display area, separated from the second connection part, and connecting the sub-pixel electrode and the second transistor through the second contact hole.

6. The liquid crystal display of claim 2, wherein the first transistors and the second transistors are arranged in the non-display areas.

7. The liquid crystal display of claim 1, wherein the second pixels are arranged adjacent to the first pixels in at least one of a horizontal direction and a vertical direction.

8. The liquid crystal display of claim 1, wherein:
the first connection parts of the first pixels and the second pixels have different lengths from each other; and
the first pixels and the second pixels further comprise compensation electrodes connected to the first connection parts, to compensate for a length difference between the first connection parts of the first pixels and the first connection parts of the second pixels.

9. The liquid crystal display of claim 8, wherein the compensation electrodes are integrally formed with the first connection parts of the first pixels and the first connection parts of the second pixels.

10. The liquid crystal display of claim 3, wherein each pixel further comprises:
a third transistor connected to the second transistor; and
a dividing capacitor comprising a coupling electrode connected to the third transistor, and a storage electrode facing the coupling electrode.

11. The liquid crystal display of claim 10, wherein:
the first substrate further comprises a storage line to receive a storage voltage; and
the storage electrode extends from the storage line.

12. The liquid crystal display of claim 10, wherein the third transistors each comprise:
a gate electrode that is electrically floated;
a source electrode disposed on the gate electrode and connected to the second transistor; and
a drain electrode disposed on the gate electrode, spaced apart from the source electrode, and connected to the coupling electrode.

13. The liquid crystal display of claim 10, wherein the third transistors each comprise:
a gate electrode connected to the gate line;
a source electrode disposed on the gate electrode and connected to the second transistor; and
a drain electrode disposed on the gate electrode, spaced apart from the source electrode, and connected to the coupling electrode.

14. The liquid crystal display of claim 3, wherein each of the first and second transistors comprises:
a gate electrode connected to the gate line;
an insulating layer covering the gate electrode; and
a source electrode connected to the data line and disposed on the insulating layer; and
a drain electrode spaced apart from the source electrode.

15. The liquid crystal display of claim 14, wherein the gate electrode of the first transistor is integrally formed with the gate electrode of the second transistor.

16. The liquid crystal display of claim 14, further comprising a semiconductor layer disposed under the data line, the source and drain electrodes of the first transistor, and the source and drain electrodes of the second transistor.

17. The liquid crystal display of claim 14, further comprising a light blocking layer disposed on the same layer as the gate electrodes of the first and second transistors, to block light incident to a lower portion of the semiconductor layer.

18. The liquid crystal layer of claim 1, wherein the common electrode comprises openings facing the main pixel electrode or the sub-pixel electrode.

19. The liquid crystal display of claim 1, wherein the liquid crystal layer comprises vertically-aligned liquid crystal molecules.

20. A liquid crystal display comprising:
a first substrate comprising pixels;
a second substrate facing the first substrate and comprising a common electrode; and
a liquid crystal layer disposed between the first substrate and the second substrate,
wherein each pixel comprises:
a first transistor;
a second transistor;
a main pixel electrode electrically connected to the first transistor;
a sub-pixel electrode electrically connected to the second transistor; and
a dummy connection part disposed between the first transistor and the main pixel electrode, or between the second transistor and the sub-pixel electrode,
wherein at least one of the main pixel electrode and the sub-pixel electrode of adjacent pixels have different shapes from each other.

21. A liquid crystal display comprising:
a first substrate comprising pixels;
a gate line extending across the first substrate; and
a data line extending across the gate line,
a second substrate facing the first substrate and comprising a common electrode; and
a liquid crystal layer disposed between the first substrate and the second substrate,
wherein each pixel comprises:
a display area;
a non-display area;
a first transistor connected to the gate line and the data line;
a second transistor connected to the gate line and the data line;
a main pixel electrode comprising a first connection part that is electrically connected to the first transistor and is disposed in the non-display area;
a sub-pixel electrode comprising a second connection part that is electrically connected to the second transistor and is disposed in the non-display area; and
a protective layer disposed between the first connection part and the first transistor, and between the second connection part and the second transistor
a third transistor connected to the second transistor, the third transistor comprising a gate electrode that is electrically floated; and
a dividing capacitor comprising a coupling electrode connected to the third transistor, and a storage electrode facing the coupling electrode.

* * * * *